United States Patent
Chang et al.

(10) Patent No.: US 7,339,618 B2
(45) Date of Patent: Mar. 4, 2008

(54) IMAGE CHROMATISM COMPENSATION METHOD FOR ADJUSTING IMAGE DISPERSION DISTANCES OF AN IMAGE

(75) Inventors: Jung-Chiao Chang, Taipei (TW); Ming-Te Chou, Taipei (TW); Hsin-Tang Chien, Keelung (TW)

(73) Assignee: Lite-On Technology Corporation, Taipei (TW)

( * ) Notice: Subject to any disclaimer, the term of this patent is extended or adjusted under 35 U.S.C. 154(b) by 774 days.

(21) Appl. No.: 10/750,826

(22) Filed: Jan. 5, 2004

(65) Prior Publication Data

US 2005/0146626 A1 Jul. 7, 2005

(51) Int. Cl.
*H04N 5/228* (2006.01)

(52) U.S. Cl. .................... 348/222.1; 348/335

(58) Field of Classification Search ............ 348/222.1, 348/335, 252, 264; 346/241, 252; 382/151, 382/163
See application file for complete search history.

(56) References Cited

U.S. PATENT DOCUMENTS

| | | | | |
|---|---|---|---|---|
| 6,587,224 B1* | 7/2003 | Nabeshima et al. | ......... | 358/1.9 |
| 6,815,625 B1* | 11/2004 | Leopold et al. | ............. | 200/296 |
| 6,829,004 B1* | 12/2004 | Abe | ........................... | 348/96 |
| 7,142,238 B1* | 11/2006 | Sawada et al. | ............. | 348/252 |
| 2005/0261849 A1* | 11/2005 | Kochi et al. | .................. | 702/85 |

* cited by examiner

*Primary Examiner*—Tuan Ho
(74) *Attorney, Agent, or Firm*—Rosenberg, Klein & Lee

(57) ABSTRACT

A method for compensating image chromatism is provided. As each RGB channel has different wavelength and refractive index, image dispersion will always occur when capturing an image from a lens. If the image dispersion is excessive, it will produce image chromatism more easily. In order to solve that, we employ the disclosed method to improve the image dispersion of each RGB channel when capturing the image from the lens using a computer program. We can further achieve the goal of image chromatism compensation.

9 Claims, 6 Drawing Sheets

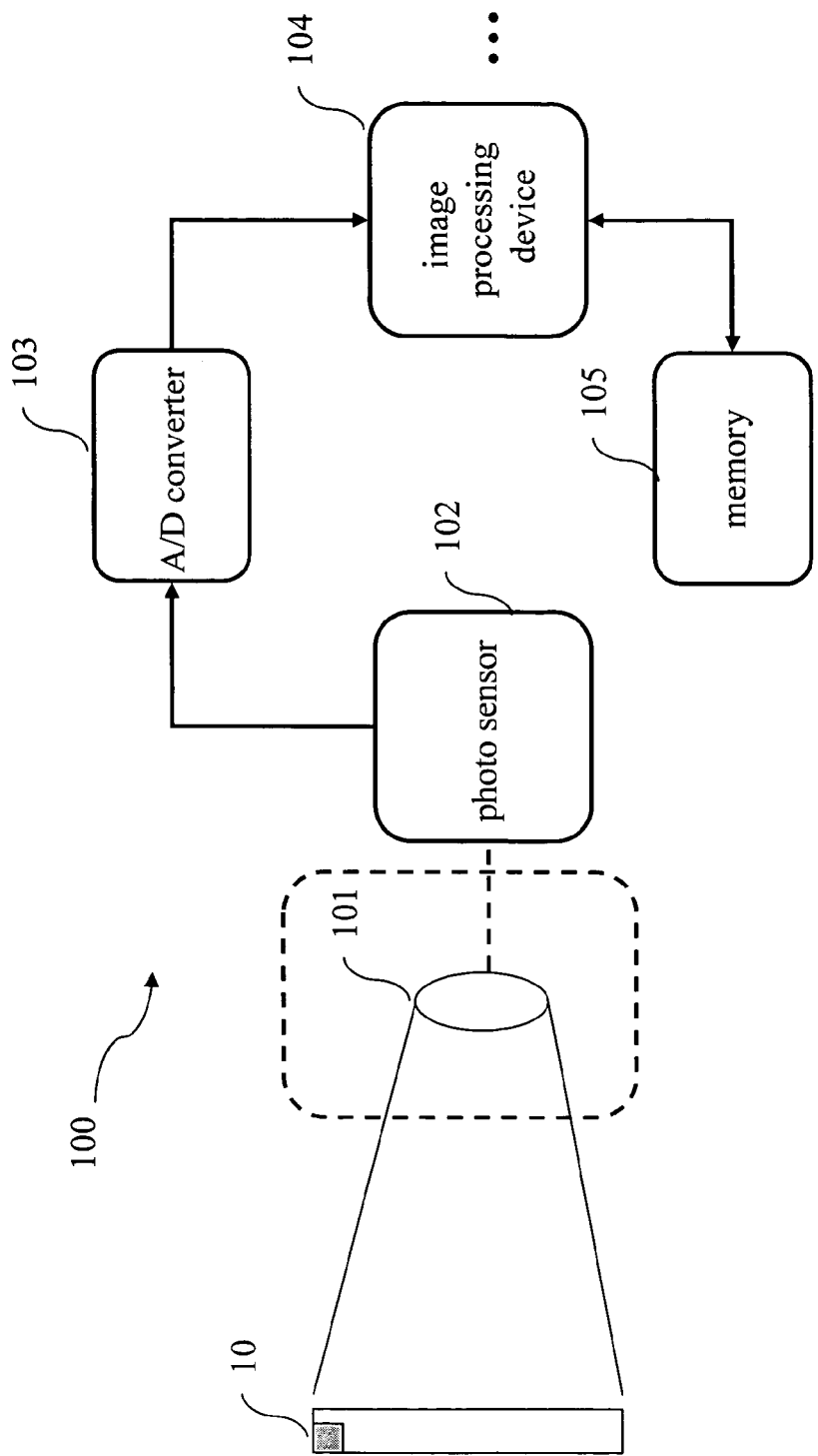
FIG.1-a (PRIOR ART)

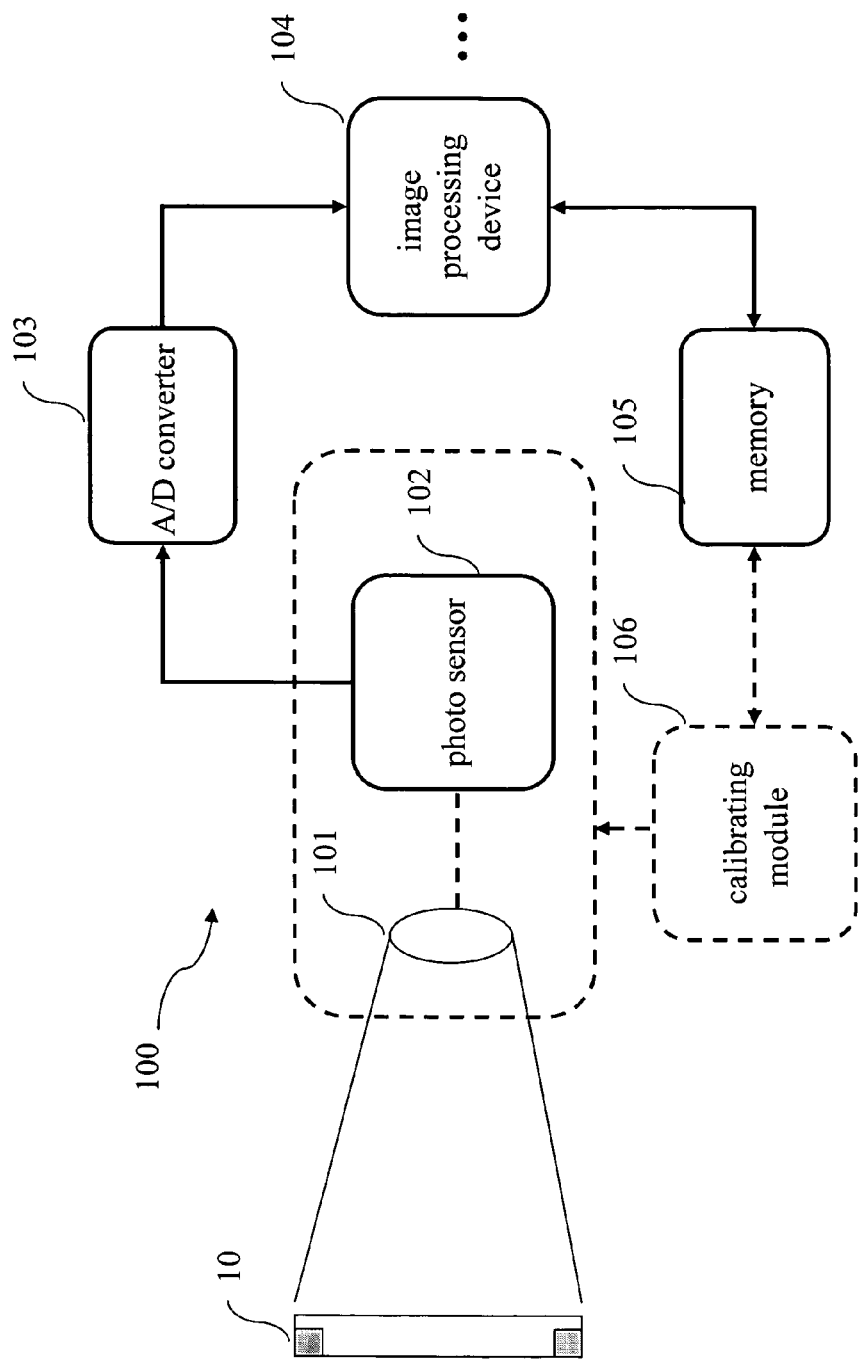
FIG.1-b

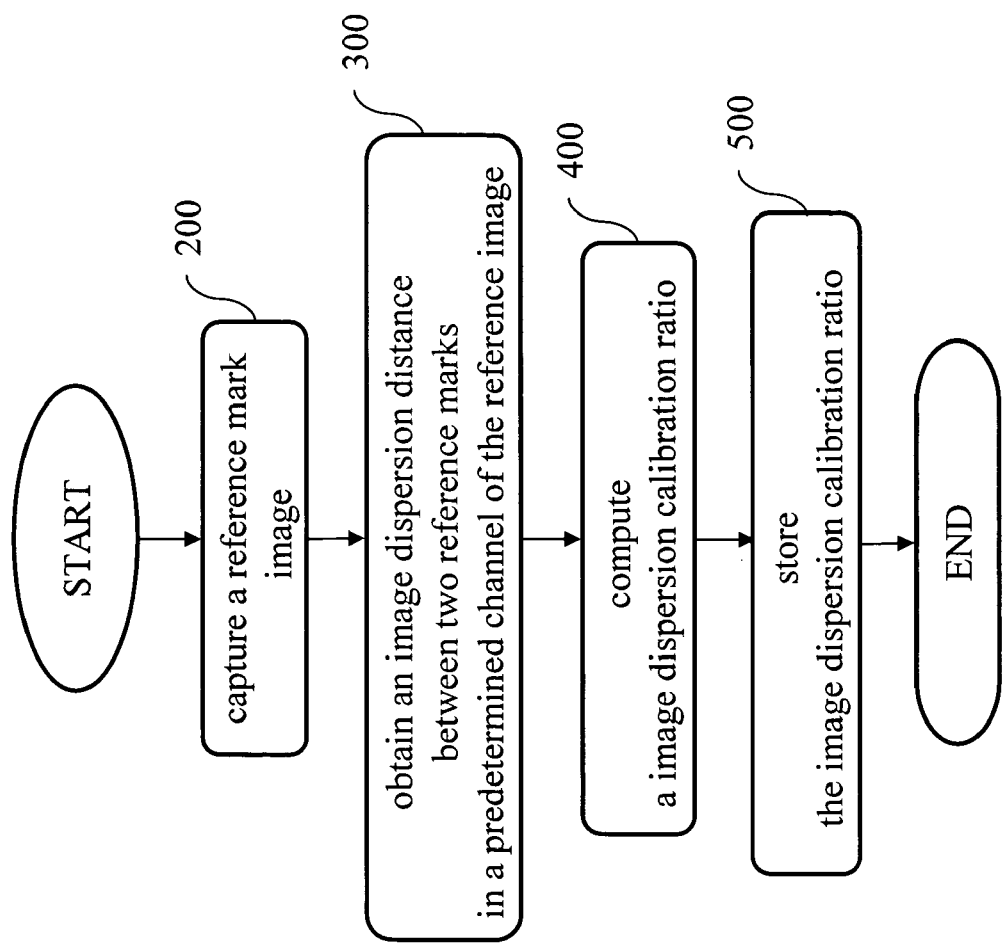

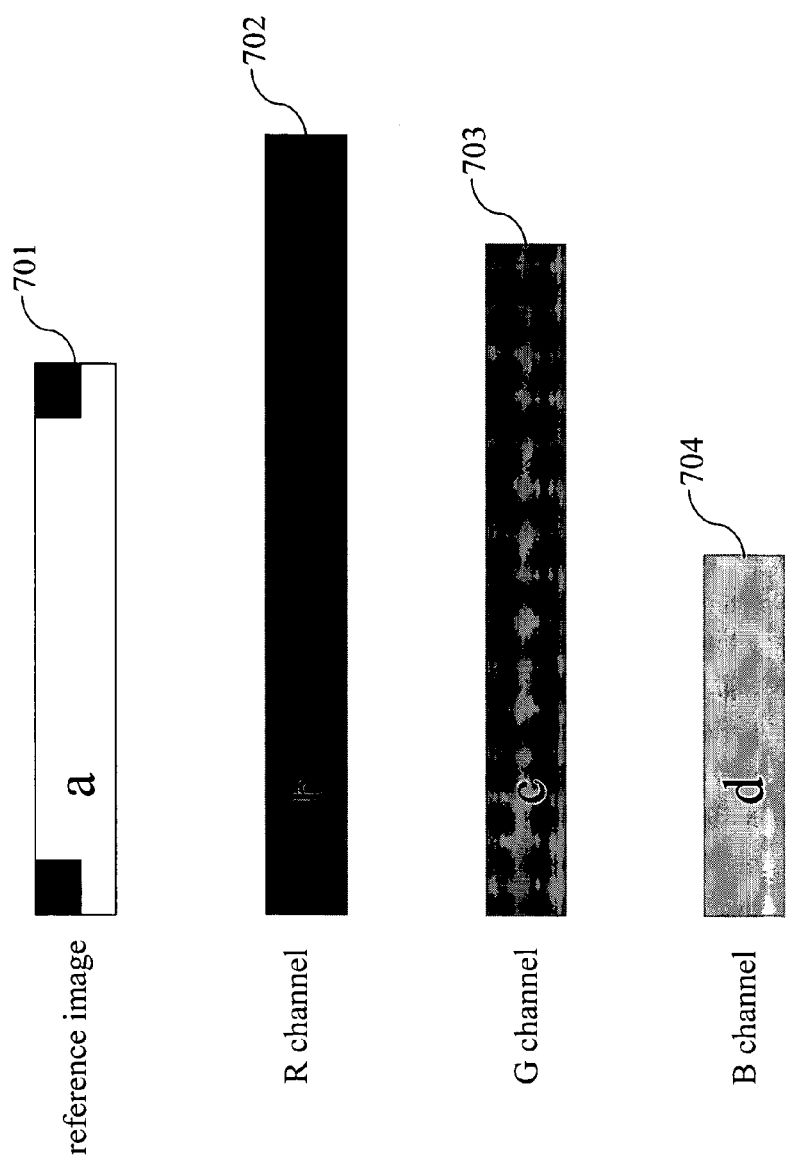
FIG.3-a

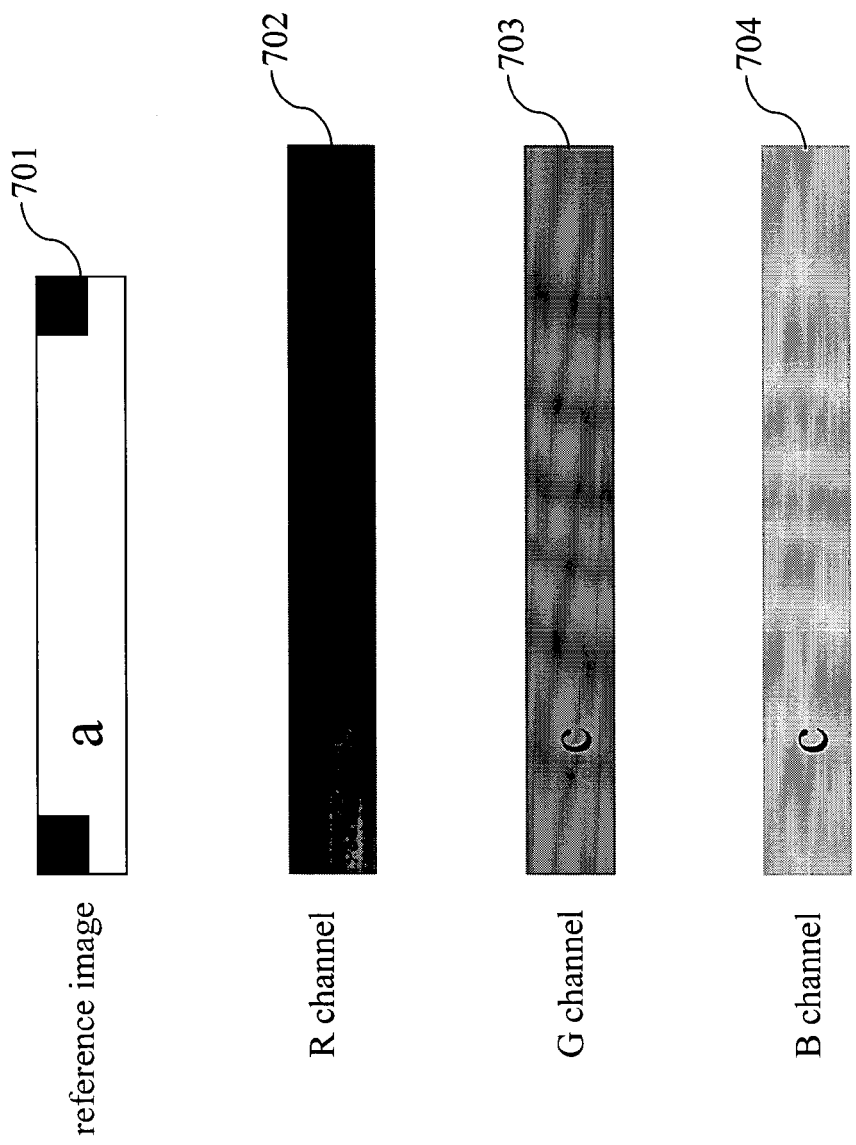
FIG.3-b

IMAGE CHROMATISM COMPENSATION METHOD FOR ADJUSTING IMAGE DISPERSION DISTANCES OF AN IMAGE

BACKGROUND OF THE INVENTION

1. Field of Invention

The invention relates to an image processing method and, in particular, to a method that calibrates the image dispersion phenomenon when capturing an image to achieve image chromatism compensation.

2. Related Art

Image capturing devices often face the image dispersion problem. The reason such a problem occurs is because the RGB channels in the image have distinct wavelengths and diffraction indices. Therefore, after the light passes through the lens of the image capturing device and is processed by the photo sensor, one always encounters the image dispersion problem. When the problem becomes serious, the output image will not look right. Therefore, we have to make image chromatism compensation.

In order to completely solve the image chromatism issue, one has to return to the problem of image dispersions. A well-known method is to make precision designs on the hardware part of the image capturing device. Usually, one modifies the focusing power of lenses so that the three colors can be converged together and received by the photo sensors. Indeed, this can solve the image chromatism problem. However, this method has at least the following two drawbacks. (1) the hardware design precision is limited. It is because the current technology cannot catch up with the precision requirement. Even if one uses the most precise manufacturing technology to fabricate the lenses, the image dispersion problem still cannot be satisfactorily solved. (2) The hardware design has a higher cost. Therefore, it is useless to spend a lot of money to design a lens that cannot achieve the required precision and still have the image dispersion problem. This is a big reason why such a method cannot be widely accepted.

How to use a computer program to help completely solving the image dispersion problem at a cheaper cost should be an interesting alternative for people in the field.

SUMMARY OF THE INVENTION

In view of the foregoing, the invention provides an image chromatism compensation method that uses a computer program to help solving the image dispersion problem and eventually achieving the image chromatism compensation.

When an image capturing device initializes, the invention obtains an image from a calibration sheet preinstalled on the image capturing device. Comparing the RGB channels in the captured image with each reference mark on the calibration sheet, the computer program compute the dispersion distance and obtain color calibration ratios. The purpose is to make all points generated from the captured image in each channel be consistent. Eventually, the output image is free from the image chromatism problem.

The invention further stores the image dispersion calibration ratios obtained by the computer program so that the image dispersion in future image captures can be rapidly calibrated.

BRIEF DESCRIPTION OF THE DRAWINGS

The invention will become more fully understood from the detailed description given hereinbelow illustration only, and thus are not limitative of the present invention, and wherein:

FIG. 1-a is a schematic view of an image capturing device in the prior art;

FIG. 1-b is a schematic view of an image capturing device disclosed herein;

FIG. 2 is a flowchart of the disclosed image chromatism compensation method;

FIG. 3-a is a schematic view of an embodiment before applying the disclosed image chromatism compensation method;

FIG. 3-b is a schematic view of an embodiment after applying the disclosed image chromatism compensation method.

DETAILED DESCRIPTION OF THE INVENTION

Figure 4:
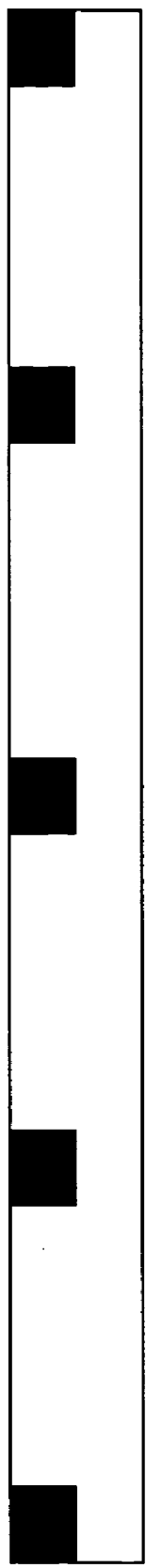
FIG. 4 is a schematic view of the disclosed method using a calibration sheet with multiple reference marks.

The invention achieves the image chromatism compensation by improving the image dispersion effects when the image capturing device 100 captures an image. The image capturing device 100 here refers to a scanner, a digital camera, or any other optical instrument that uses lenses and photo sensors to capture images.

FIG. 1-a is a schematic view of a conventional image capturing device 100. It contains all basic components, such as the lens 100, the photo sensor 102, the analog/digital converter (ADC) 103, the image processing device 104, the memory device 105, etc. After the lens 101 captures an external image (such as the calibration sheet), the photo sensor 102 converts into the corresponding analog signal. The ADC 103 then converts the analog signal into a digital signal that can accepted by the image processing device 104. The digital signal is sent to other devices (not shown) for subsequent image processes. The processed result is stored in the memory device 105.

However, a long-lasting problem in such an image capturing process is the image dispersion phenomenon. This is because all RGB channels in the captured image have different wavelengths and diffractive indices. The output lengths from the photo sensor 102 for the same point in the image are thus different. When the image dispersion becomes too serious, the output image will have the image chromatism problem. The prior art solves this problem by improving the hardware design of the lens 101 (as shown by the region enclosed by the dashed line in FIG. 1-a). The converging precision of the lens 101 is enhanced so that the output lengths generated by all channels in the image can be closer to the reality. The drawback is that the cost is too high and the required high precision cannot be easily achieved.

The invention uses a computer program to solve such a problem. With reference to FIG. 1-b, the invention features in an additional calibrating module 106 that runs when the image capturing device 100 initializes or each image capturing process starts. The region enclosed by the dashed line is the operation range of the disclosed method. The actual procedure flow is shown in FIG. 2.

First, the disclosed method starts when the image capturing device 100 turns on to perform calibrations. When the image capturing device 100 initializes, it extracts a reference mark on the calibration sheet 10 (step 200). The calibration sheet 10 has at least two reference marks for calibrating the position of the captured image. The invention uses the positions of these reference marks to process image dispersion calibration for the RGB channels in the image. Take two reference marks as an example, one can obtain the image dispersion distance between the two reference marks in each of the RGB channels (as shown in FIG. 3-*a*). One then obtains the image dispersion distance of the two reference marks in a predetermined channel (step 300). The predetermined channel can be any one of the RGB channels (a common choice is the G channel). Afterwards, the so-called image dispersion calibration ratios are computed (step 400). The image dispersion calibration ratios are used to adjust the image dispersion distance of the other two channels. The expression is as follows:

1: (distance between the two reference marks in the predetermined channel)/(distance between the two reference marks of first other channel):(distance between the two reference marks in the predetermined channel)/(distance between the two reference marks of second other channel); wherein the distances are measured in units of pixels.

Finally, the computed image dispersion calibration ratios are stored (step 600). Before the image capturing device 100 starts, the disclosed method is executed to achieve image chromatism compensations each time an image is captured.

The disclosed method is executed before actually capturing images. It is usually performed at the stage of calibrating the image capturing device. The recorded image dispersion calibration ratios are used to adjust the image dispersion distances of other channels while capturing images. The purpose of the adjustment is to make all channels displayed at the same point consistent with one another. This can avoid the problem of image dispersion in the output image.

The adjustment is performed as follows. The distance between two reference marks in each channel of the captured image is multiplied by the recorded image dispersion calibration ratios. This fixes the each channel to have the same image dispersion distance as the predetermined channel.

The invention also has other embodiments. For example, the distance between two reference marks of a predetermined channel is directly assigned. The distance between the two reference marks of any other channel is then replaced by the assigned distance. The method can also be applied to the case when the calibration sheet has more than two reference marks (as shown in FIG. 4). Likewise, one records the image dispersion calibration ratios of every two reference marks. When taking actual images, individual image dispersion calibrations are performed for different positions. This makes the calibration more perceptible.

FIGS. 3-*a* and 3-*b* are schematic view of the embodiments of the disclosed method. This embodiment has two reference marks. FIG. 3-*a* shows the reference mark image 701 before calibration and the image dispersion in the RGB channels 702, 703, 704. From the drawing, one sees that the image dispersion distances between the reference mark image 701 and the channels are different (the a, b, c, and d pixels, respectively). Therefore, one has to perform image chromatism compensations. This embodiment sets the G channel 703 as the predetermined channel. It computes the image dispersion calibration ratios of the R channel 702 and the B channel 704 to be c/b and c/d, respectively. The image dispersion calibration ratios (1:c/b:c/d) are stored for later adjustments in each channel of captured images.

During the process of capturing an image, the disclosed method uses the stored image dispersion calibration ratios (1:c/b:c/d) to make adjustments of the image dispersion distances in other channels, as shown in FIG. 3-*b*. That is, the image dispersion distances in the R channel 702 and the B channel 704 (i.e. b and d) are multiplied by the recorded image dispersion calibration ratios (i.e. c/b and c/d). Thus, the image dispersion distances in the R channel 702 and the B channel 704 both become c as in the G channel 703. This solves the image chromatism problem.

Certain variations would be apparent to those skilled in the art, which variations are considered within the spirit and scope of the claimed invention.

What is claimed is:

1. An image chromatism compensation method for adjusting image dispersion distances in all channels of an image captured by an image capturing device to achieve image chromatism compensation, the method comprising the steps of:

capturing a reference mark image;

obtaining an image dispersion distance between two reference marks in a predetermined channel of the reference image;

obtaining an image dispersion distance between the two reference marks in a first other channel of the reference image;

obtaining an image dispersion distance between the two reference marks in a second other channel of the reference image;

computing a image dispersion calibration ratio, wherein the image dispersion calibration ratio is 1 : (distance between the two reference marks in the predetermined channel) / (distance between the two reference marks of first other channel) : (distance between the two reference marks in the predetermined channel) / (distance between the two reference marks of second other channel), and the distances are measured in units of pixels; and storing the image dispersion calibration ratio.

2. The method of claim 1, wherein the image capturing device is a scanner.

3. The method of claim 1, wherein the image capturing device is a digital camera.

4. The method of claim 1, wherein the reference image contains at least two reference marks.

5. The method of claim 1, wherein the reference image is obtained from a calibration sheet with at least two reference marks.

6. The method of claim 1, wherein the reference image is obtained from the calibration sheet with at least two reference marks in the image capturing device.

7. The method of claim 1, wherein the predetermined channel is selected from the group consisting of an R channel, a G channel, and a B channel.

8. The method of claim 1, wherein the first other channel and the second other channel refer to the channels in the RGB channels that are different from the predetermined channel.

9. The method of claim 1 being carried out when the image capturing device powers on for calibration.

* * * * *